US011698448B1

United States Patent
Luff et al.

(10) Patent No.: US 11,698,448 B1
(45) Date of Patent: Jul. 11, 2023

(54) REDUCTION OF ELECTRICAL COMPONENTS IN LIDAR SYSTEMS FOR IDENTIFYING A BEAT FREQUENCY BY USING PEAKS OF OUTPUTS OF TWO TRANSFORMS

(71) Applicant: SiLC Technologies, Inc., Monrovia, CA (US)

(72) Inventors: Bradley Jonathan Luff, La Canada Flintridge, CA (US); Mehdi Asghari, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 359 days.

(21) Appl. No.: 16/912,680

(22) Filed: Jun. 25, 2020

(51) Int. Cl.
| | |
|---|---|
| G01S 7/499 | (2006.01) |
| G01S 7/4912 | (2020.01) |
| G01S 17/88 | (2006.01) |
| B60W 50/14 | (2020.01) |
| G01S 7/481 | (2006.01) |
| G06F 17/14 | (2006.01) |

(52) U.S. Cl.
CPC .............. *G01S 7/499* (2013.01); *G01S 7/481* (2013.01); *G06F 17/14* (2013.01)

(58) Field of Classification Search
CPC ........ G01S 7/4917; G01S 17/88; B60W 50/14
See application file for complete search history.

(56) References Cited

U.S. PATENT DOCUMENTS

| | | | |
|---|---|---|---|
| 11,067,668 B1* | 7/2021 | Bravo ................... | G01S 17/88 |
| 2012/0038506 A1* | 2/2012 | Kanamoto et al. .. | G01S 13/584 342/158 |
| 2020/0284913 A1* | 9/2020 | Amelot et al. ........ | B60W 50/14 |
| 2021/0356592 A1* | 11/2021 | Behroozpour ....... | G01S 7/4917 |

\* cited by examiner

*Primary Examiner* — Farzad Kazeminezhad
(74) *Attorney, Agent, or Firm* — Gavrilovich, Dodd & Lindsey LLP

(57) ABSTRACT

The LIDAR system includes a first transform component configured to perform a complex mathematical transform on first signals. The LIDAR system also includes a second transform component configured to perform a real mathematical transform on second signals. Electronics are configured to use an output of the first transform component in combination with an output of the second transformation component to generate LIDAR data. The electronics are further configured to use a peak in the output of the first transform component to identify the peak in the output of the second transform component that is located at the beat frequency of the second signals.

20 Claims, 6 Drawing Sheets

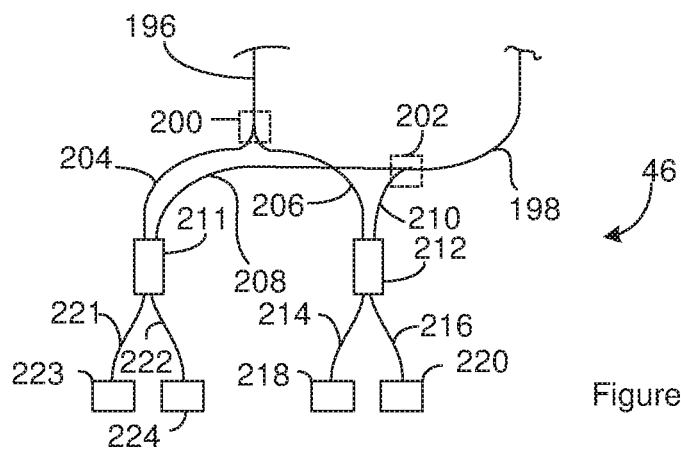
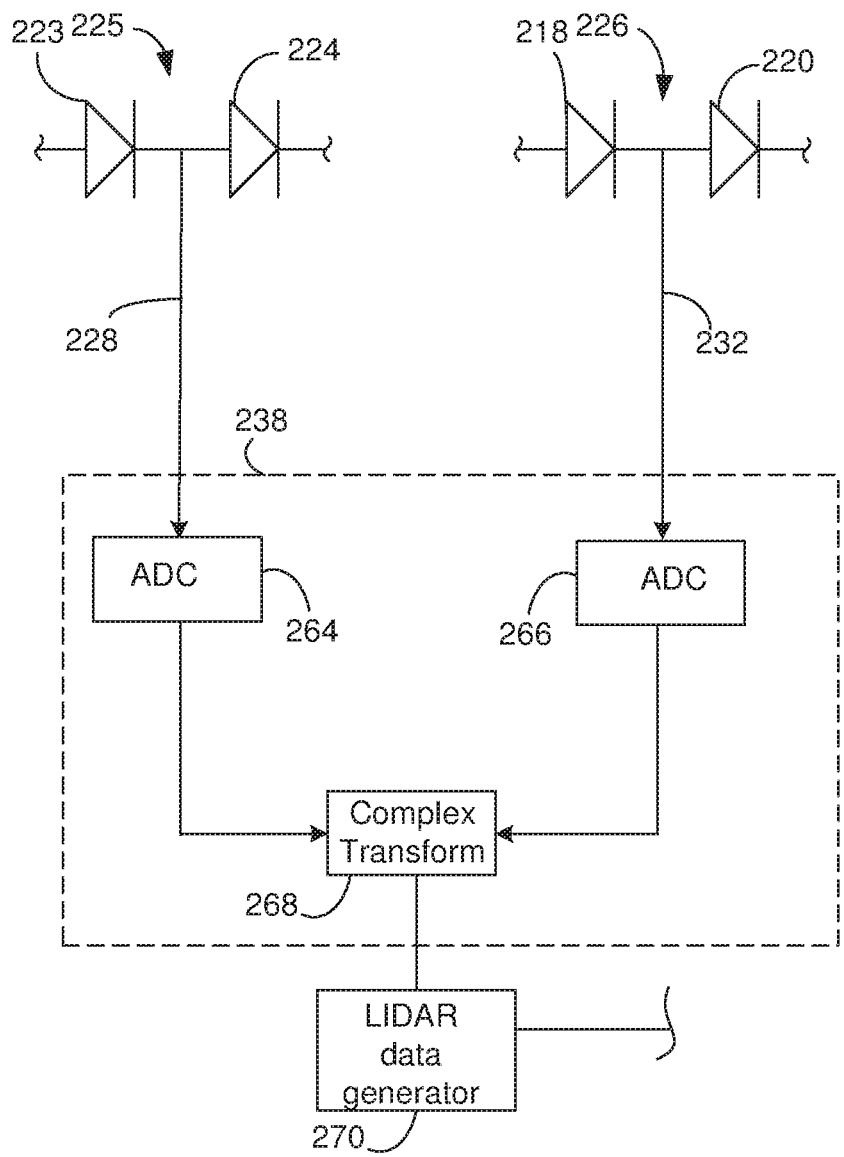
Figure 4A
Figure 4B

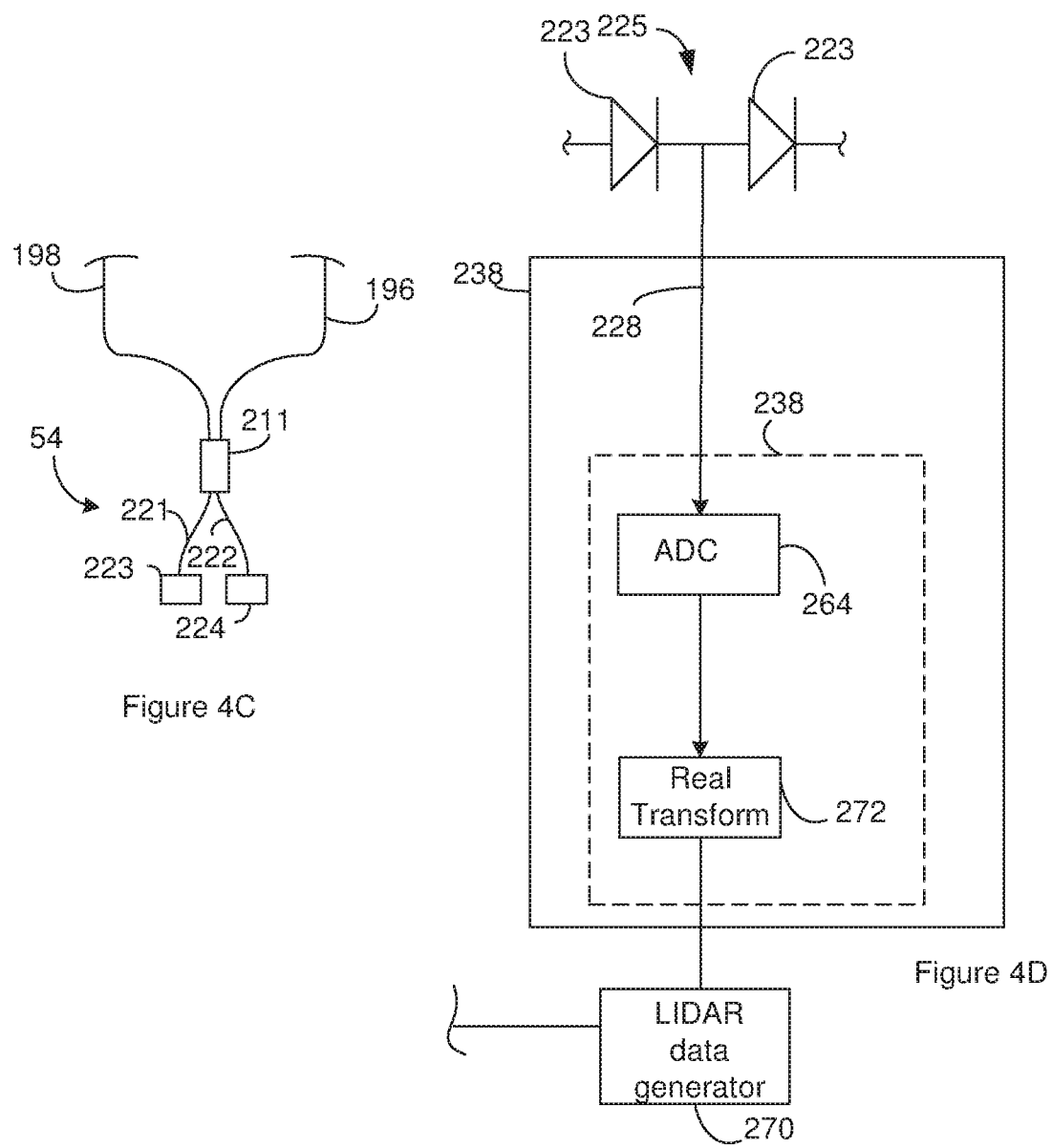

REDUCTION OF ELECTRICAL COMPONENTS IN LIDAR SYSTEMS FOR IDENTIFYING A BEAT FREQUENCY BY USING PEAKS OF OUTPUTS OF TWO TRANSFORMS

FIELD

The invention relates to optical devices. In particular, the invention relates to LIDAR systems.

BACKGROUND

There is an increasing commercial demand for LIDAR systems that can be deployed in a variety of applications including ADAS (Advanced Driver Assistance Systems) and AR (Augmented Reality). LIDAR systems typically output a system output signal that is reflected by an object located outside of the LIDAR system. At least a portion of the reflected light signal returns to the LIDAR system in a system return signal. The LIDAR system directs the received light signal to a light sensor that converts the light signal to an electrical signal. Electronics can use the light sensor output to quantify LIDAR data that can indicate a variety of data such as the radial velocity and/or distance between the object and the LIDAR system.

The system output signals are often polarized in that the light is in a single polarization state. However, reflection of this light by the object can change the polarization state of all or a portion of the system output signal. This change in polarization states is often a source of signal loss in the LIDAR output signal. As a result, LIDAR systems have been developed that process system return signals having multiple different polarization states. However, these system have electronics that are duplicated in order to process the different polarization states separately from one another. The use of duplicated electronics increases the costs and/or complexity of these LIDAR systems. As a result, there is a need for improved LIDAR systems.

SUMMARY

A LIDAR system includes a first transform component configured to perform a complex mathematical transform on first signals. The LIDAR system also includes a second transform component configured to perform a real mathematical transform on second signals. Electronics are configured to use an output of the first transform component in combination with an output of the second transformation component to generate LIDAR data.

Another version of a LIDAR system includes a first transform component configured to receive first digital signals from multiple different input lines and to perform a first mathematical transform on the first digital signals received from the different input lines. The LIDAR system also includes a second transform component configured receive second digital signals from only one input line and to perform a second mathematical transform on the second digital signals. Electronics are configured to use an output of the first transform component in combination with an output of the second transformation component to generate LIDAR data.

In some instances, the output of the second transform component has multiple different peaks that each occurs at a frequency that is a candidate for a beat frequency of the second signals. Additionally, the electronics are configured to use a peak in the output of the first transform component to identify which one of the peaks in the output of the second transform component is located at the beat frequency of the second signals.

A method of operating a LIDAR system includes performing a first mathematical transform on first digital signals received on multiple different lines. The method also includes performing a second mathematical transform on second digital signals received on a single line. The method further includes using an output of the first transform component in combination with an output of the second transformation component to generate LIDAR data. In some instances, the method includes using a peak in the output of the first transform component to select a peak in the output of the second transform component from among multiple candidate peaks in the output of the second transform component. The selected peak being the peak that is at the beat frequency of the second signals.

BRIEF DESCRIPTION OF THE FIGURES

FIG. 4A illustrates an example of a first processing component suitable for use with the LIDAR systems.

FIG. 4B provides a schematic of electronics that are suitable for use with a first processing component constructed according to FIG. 4A.

FIG. 4C illustrates an example of a second processing component suitable for use with the LIDAR systems.

FIG. 4D provides a schematic of electronics that are suitable for use with a second processing component constructed according to FIG. 4C.

DESCRIPTION

A LIDAR system includes one or more optical components through which a system output signal is transmitted. The light from the system output signal can be reflected by an object located outside the LIDAR system and can return to the LIDAR system. The reflection can change the polarization state of the reflected light or the polarization state of the light can be unchanged by the reflection. As a result, the reflected light can be in a first polarization state and/or in a second polarization state.

The LIDAR system also includes multiple transform components that each performs a mathematical transform on a different beating signal. The beating signals can be electrical signals that were each generated from the light that was reflected by the object. A first portion of the transform components perform the mathematical transform on beating signals that were generated from light that was reflected in the same polarization state as the polarization state of the system output signal. A second portion of the transform components perform the mathematical transform on beating signals that were generated from light that was reflected in a different polarization state than the system output signal.

The first portion of the transform components can perform a complex transform on the beating signals while the second portion of the transform components can perform a real transform on the beating signals. Real transforms can output multiple different possible solutions for the beat frequency of the beating signals and it can be unclear which of the solutions is the correct solution. In contrast, the complex transforms output a single unambiguous solution for the frequency of the beating signals. The LIDAR system can include electronics that use the beat frequency indicated by the complex transforms to identify the correct beat frequency solution in the output of the real transforms. The identity of the correct beat frequency solution in the output of the real transforms allows the electronics to combine the outputs of the first and second transform components to generate LIDAR data.

Real transforms require fewer electrical components than are required by complex transforms. For instance, real transforms can have fewer input lines and can accordingly require fewer analog-to-digital converters. As a result, the use of real transforms reduces the complexity and costs associated with the LIDAR system.

Figure 1:
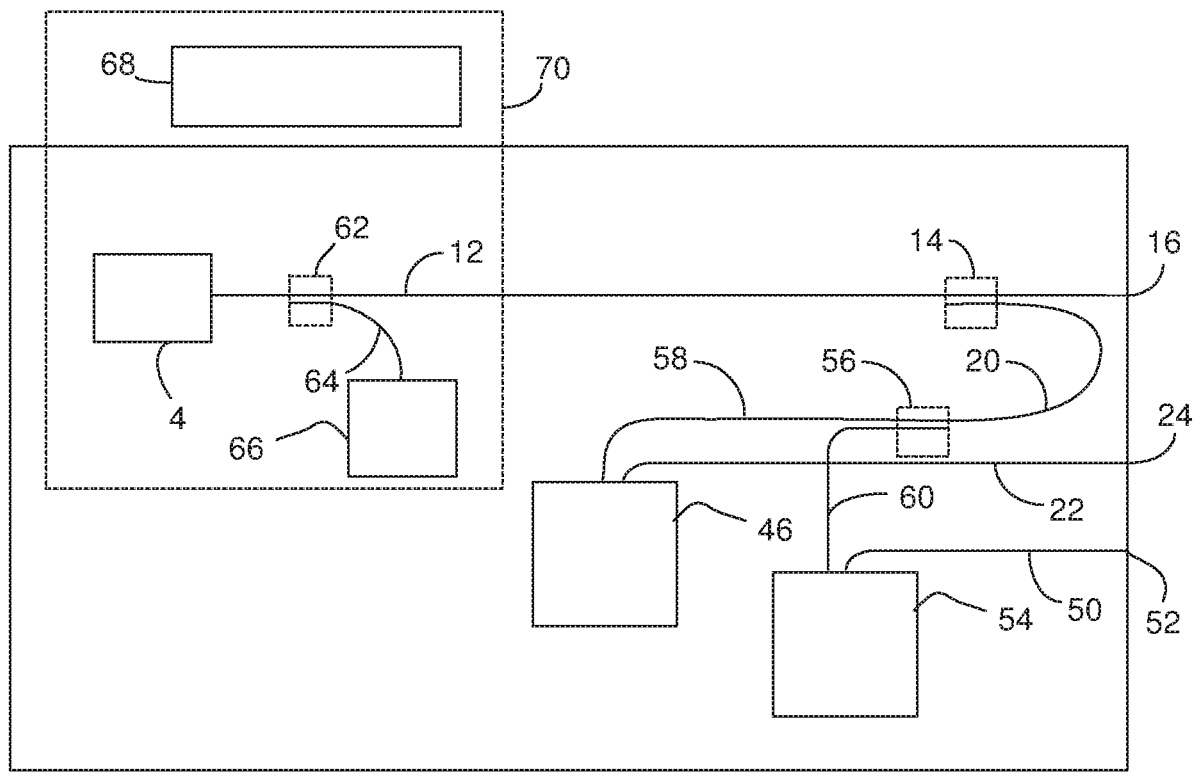
FIG. 1 is a topview of a schematic of an embodiment of a LIDAR system that includes or consists of a LIDAR chip that outputs a LIDAR output signal and receives multiple LIDAR input signals on different waveguides.

FIG. 1 is a topview of a schematic of a LIDAR chip that can serve as a LIDAR system or can be included in a LIDAR system that includes components in addition to the LIDAR chip. The LIDAR chip can include a Photonic Integrated Circuit (PIC) and can be a Photonic Integrated Circuit chip. The LIDAR chip includes a light source 4 that outputs a preliminary outgoing LIDAR signal. A suitable light source 4 includes, but is not limited to, semiconductor lasers such as External Cavity Lasers (ECLs), Distributed Feedback lasers (DFBs), Discrete Mode (DM) lasers and Distributed Bragg Reflector lasers (DBRs).

The LIDAR chip includes a utility waveguide 12 that receives an outgoing LIDAR signal from a light source 4. The utility waveguide 12 carries the outgoing LIDAR signal to a splitter 14. The splitter 14 moves a portion of the outgoing LIDAR signal from the utility waveguide 12 onto a reference waveguide 20 as a reference signal. The percentage of light transferred from the utility waveguide 12 by the splitter 14 can be fixed or substantially fixed. For instance, the splitter 14 can be configured such that the power of the reference signal transferred to the reference waveguide 20 is a percentage of the power of the outgoing LIDAR signal. In some instances, the percentage is greater than 5%, 10% or 20 and/or less than 50%, or 60%. Suitable splitters 14 include, but are not limited to, optical couplers, y-junctions, tapered couplers, and Multi-Mode Interference (MMI) devices.

The utility waveguide 12 terminates at a facet 16 and carries the outgoing LIDAR signal to the facet 16. The facet 16 can be positioned such that the outgoing LIDAR signal traveling through the facet 16 exits the LIDAR chip and serves as a LIDAR output signal. For instance, the facet 16 can be positioned at an edge of the chip so the outgoing LIDAR signal traveling through the facet 16 exits the chip and serves as the LIDAR output signal. In some instances, the portion of the LIDAR output signal that has exited from the LIDAR chip can also be considered a system output signal.

As an example, when the exit of the LIDAR output signal from the LIDAR chip is also an exit of the LIDAR output signal from the LIDAR system, the LIDAR output signal can also be considered a system output signal.

Light from the LIDAR output signal travels away from the LIDAR system through free space in the atmosphere in which the LIDAR system is positioned. The light from the LIDAR output signal may be reflected by one or more objects in the path of the LIDAR output signal. When the light from the LIDAR output signal is reflected, at least a portion of the reflected light travels back toward the LIDAR chip as a first LIDAR input signal. In some instances, the first LIDAR input signal can also be considered a first system return signal. As an example, when the exit of the LIDAR output signal from the LIDAR chip is also an exit of the LIDAR output signal from the LIDAR system, the first LIDAR input signal can also be considered a first system return signal.

The first LIDAR input signals enters a comparative waveguide 22 through the facet 24 and serves as a first comparative signal. The comparative waveguide 22 carries the first comparative signal to a first processing component 46 for further processing.

When the light from the LIDAR output signal is reflected, at least a portion of the reflected light can travel back toward the LIDAR chip as a second LIDAR input signal. In some instances, the second LIDAR input signal can also be considered a first system return signal. As an example, when the exit of the LIDAR output signal from the LIDAR chip is also an exit of the LIDAR output signal from the LIDAR system, the second LIDAR input signal can also be considered a second system return signal.

The second LIDAR input signals enters a second comparative waveguide 50 through a facet 52 and serves as a second comparative signal carried by the second comparative waveguide 50. The second comparative waveguide 50 carries the second comparative signal to a second processing component 54 for further processing.

A splitter 56 is configured to place a portion of the reference signal carried on the reference waveguide 20 on a first reference waveguide 58 and another portion of the reference signal on a second reference waveguide 60. Accordingly, the first reference waveguide 58 carries a first reference signal and the second reference waveguide 60 carries a second reference signal. The first reference waveguide 58 carries the first reference signal to the first processing component 46 and the second reference waveguide 60 carries the second reference signal to the second processing component 54. Examples of suitable splitters 56 include, but are not limited to, y-junctions, optical couplers, and multi-mode interference couplers (MMIs).

As will be described in more detail below, the first processing component 46 and the second processing component 54 each combines a comparative signal with a reference signal to form a composite signal that carries LIDAR data for a sample region on the field of view. Accordingly, the composite signal can be processed so as to extract LIDAR data (one or more data selected from the group consisting of one or more reflecting object material indicators, radial velocity between the LIDAR system and an object external to the LIDAR system, and distance between the LIDAR system and the object) for the sample region.

Although the light source 4 is shown as being positioned on the LIDAR chip, the light source 4 can be located off the LIDAR chip. For instance, the utility waveguide 12 can terminate at a second facet through which the outgoing LIDAR signal can enter the utility waveguide 12 from a light source 4 located off the LIDAR chip.

The LIDAR chip can include a control branch for controlling operation of the light source 4. The control branch includes a splitter 62 that moves a portion of the outgoing LIDAR signal from the utility waveguide 12 onto a control waveguide 64. The coupled portion of the outgoing LIDAR signal serves as a tapped signal. Although FIG. 1 illustrates a directional coupler operating as the splitter 62, other signal tapping components can be used as the splitter 62. Suitable splitters 62 include, but are not limited to, directional couplers, optical couplers, y-junctions, tapered couplers, and Multi-Mode Interference (MMI) devices.

The control waveguide 64 carries the tapped signal to control components 66. The control components 66 can be in electrical communication with electronics 68. All or a portion of the control components 66 can be included in the electronics 68. During operation, the electronics can employ output from the control components 66 in a control mechanism 70 configured to control a process variable of one, two, or three controlled light signals selected from the group consisting of the tapped signal, the system output signal, and the outgoing LIDAR signal. Examples of the suitable process variables include the frequency of the controlled light signal and/or the phase of the controlled light signal.

In some instances, a LIDAR chip constructed according to FIG. 1 is used in conjunction with a LIDAR adapter. In some instances, the LIDAR adapter can be physically optically positioned between the LIDAR chip and the one or more reflecting objects and/or the field of view in that an optical path that the first LIDAR input signal(s) and/or the LIDAR output signal travels from the LIDAR chip to the field of view passes through the LIDAR adapter. Additionally, the LIDAR adapter can be configured to operate on the first LIDAR input signal and the LIDAR output signal such that the first LIDAR input signal and the LIDAR output signal travel on different optical pathways between the LIDAR adapter and the LIDAR chip but on the same optical pathway between the LIDAR adapter and a reflecting object in the field of view. Additionally or alternately, the LIDAR adapter can be configured to operate on the second LIDAR input signal and the LIDAR output signal such that the second LIDAR input signal and the LIDAR output signal travel on different optical pathways between the LIDAR adapter and the LIDAR chip but on the same optical pathway between the LIDAR adapter and a reflecting object in the field of view.

Figure 2:
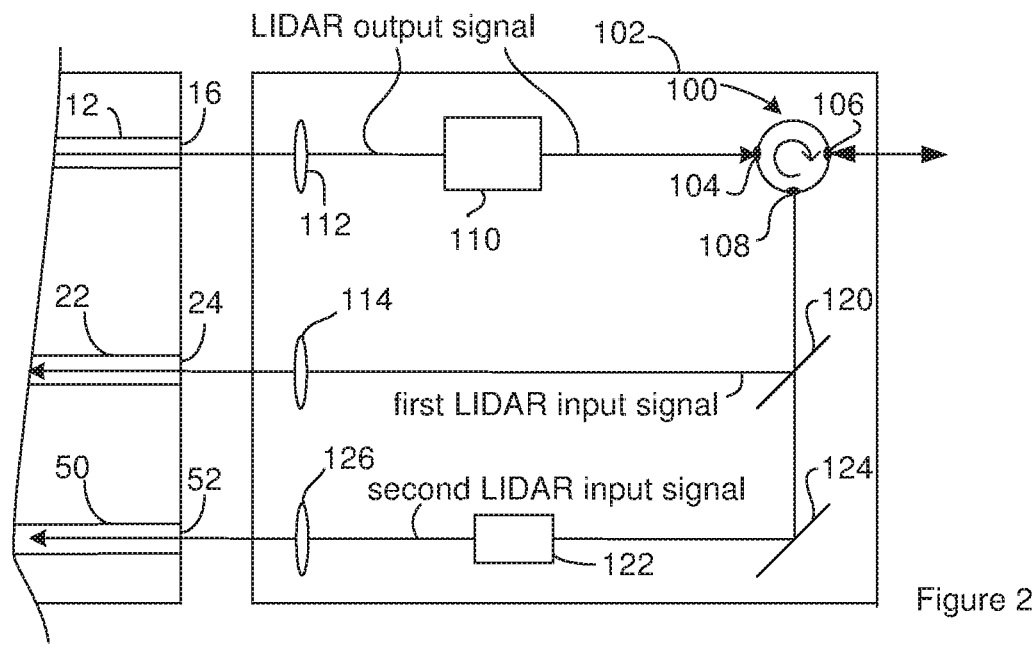
FIG. 2 illustrates an example of a LIDAR adapter that is suitable for use with the LIDAR chip of FIG. 1.

FIG. 2 illustrates an example of a LIDAR adapter that is suitable for use with the LIDAR chip of FIG. 1. The LIDAR adapter includes multiple components positioned on a base. For instance, the LIDAR adapter includes a circulator 100 positioned on a base 102. The illustrated optical circulator 100 includes three ports and is configured such that light entering one port exits from the next port. For instance, the illustrated optical circulator includes a first port 104, a second port 106, and a third port 108. The LIDAR output signal enters the first port 104 from the utility waveguide 12 of the LIDAR chip and exits from the second port 106.

The LIDAR adapter can be configured such that the output of the LIDAR output signal from the second port 106 can also serve as the output of the LIDAR output signal from the LIDAR adapter and accordingly from the LIDAR system. As a result, the LIDAR output signal can be output from the LIDAR adapter such that the LIDAR output signal is traveling toward a sample region in the field of view. Accordingly, in some instances, the portion of the LIDAR output signal that has exited from the LIDAR adapter can also be considered the system output signal. As an example, when the exit of the LIDAR output signal from the LIDAR adapter is also an exit of the LIDAR output signal from the LIDAR system, the LIDAR output signal can also be considered a system output signal.

The LIDAR output signal output from the LIDAR adapter includes, consists of, or consists essentially of light from the LIDAR output signal received from the LIDAR chip. Accordingly, the LIDAR output signal output from the LIDAR adapter may be the same or substantially the same as the LIDAR output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter and/or the LIDAR adapter can optionally include an amplifier configured to amplify the LIDAR output signal as it travels through the LIDAR adapter.

When one or more objects in the sample region reflect the LIDAR output signal, at least a portion of the reflected light travels back to the circulator 100 as a system return signal. The system return signal enters the circulator 100 through the second port 106. FIG. 2 illustrates the LIDAR output signal and the system return signal traveling between the LIDAR adapter and the sample region along the same optical path.

The system return signal exits the circulator 100 through the third port 108. The LIDAR adapter includes a beamsplitter 120 that receives the system return signal from the circulator 100. The beamsplitter 120 splits the system return signal into a first portion of the system return signal and a second portion of the system return signal. Suitable beamsplitters include, but are not limited to, Wollaston prisms, and MEMS-based beamsplitters.

The first portion of the system return signal is directed to the comparative waveguide 22 on the LIDAR chip and serves as the first LIDAR input signal described in the context of FIG. 1. The second portion of the system return signal is directed a polarization rotator 122. The polarization rotator 122 outputs a second LIDAR input signal that is directed to the second input waveguide 76 on the LIDAR chip and serves as the second LIDAR input signal.

The beamsplitter 120 can be a polarizing beam splitter. One example of a polarizing beamsplitter is constructed such that the first portion of the system return signal has a first polarization state but does not have or does not substantially have a second polarization state and the second portion of the system return signal has a second polarization state but does not have or does not substantially have the first polarization state. The first polarization state and the second polarization state can be linear polarization states and the second polarization state is different from the first polarization state. For instance, the first polarization state can be TE and the second polarization state can be TM or the first polarization state can be TM and the second polarization state can be TE. In some instances, the laser source can linearly polarized such that the LIDAR output signal has the first polarization state. Suitable beamsplitters include, but are not limited to, Wollaston prisms, and MEMs-based polarizing beamsplitters.

A polarization rotator can be configured to change the polarization state of the first portion of the system return signal and/or the second portion of the system return signal. For instance, the polarization rotator 122 shown in FIG. 2 can be configured to change the polarization state of the second portion of the system return signal from the second polarization state to the first polarization state. As a result, the second LIDAR input signal has the first polarization state but does not have or does not substantially have the second polarization state. Accordingly, the first LIDAR input signal and the second LIDAR input signal each have the same polarization state (the first polarization state in this example). Despite carrying light of the same polarization state, the first LIDAR input signal and the second LIDAR input signal are associated with different polarization states as a result of the use of the polarizing beamsplitter. For instance, the first LIDAR input signal carries the light reflected with the first polarization state and the second LIDAR input signal carries the light reflected with the second polarization state. As a result, the first LIDAR input signal is associated with the first polarization state and the second LIDAR input signal is associated with the second polarization state.

Since the first LIDAR input signal and the second LIDAR carry light of the same polarization state, the comparative signals that result from the first LIDAR input signal have the same polarization angle as the comparative signals that result from the second LIDAR input signal.

Suitable polarization rotators include, but are not limited to, rotation of polarization-maintaining fibers, Faraday rotators, half-wave plates, MEMs-based polarization rotators and integrated optical polarization rotators using asymmetric y-branches, Mach-Zehnder interferometers and multi-mode interference couplers.

Since the outgoing LIDAR signal is linearly polarized, the first reference signals can have the same linear polarization state as the second reference signals. Additionally, the components on the LIDAR adapter can be selected such that the first reference signals, the second reference signals, the comparative signals and the second comparative signals each have the same polarization state. In the example disclosed in the context of FIG. 2, the first comparative signals, the second comparative signals, the first reference signals, and the second reference signals can each have light of the first polarization state.

As a result of the above configuration, first composite signals generated by the first processing component 46 and second composite signals generated by the second processing component 54 each results from combining a reference signal and a comparative signal of the same polarization state and will accordingly provide the desired beating between the reference signal and the comparative signal. For instance, the composite signal results from combining a first reference signal and a first comparative signal of the first polarization state and excludes or substantially excludes light of the second polarization state or the composite signal results from combining a first reference signal and a first comparative signal of the second polarization state and excludes or substantially excludes light of the first polarization state. Similarly, the second composite signal includes a second reference signal and a second comparative signal of the same polarization state will accordingly provide the desired beating between the reference signal and the comparative signal. For instance, the second composite signal results from combining a second reference signal and a second comparative signal of the first polarization state and excludes or substantially excludes light of the second polarization state or the second composite signal results from combining a second reference signal and a second comparative signal of the second polarization state and excludes or substantially excludes light of the first polarization state.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the composite signals and the second composite signal). Combining the LIDAR data can include taking an average, median, or mode of the LIDAR data generated from the different composite signals. For instance, the electronics can average the distance between the LIDAR system and the reflecting object determined from the composite signal with the distance determined from the second composite signal and/or the electronics can average the radial velocity between the LIDAR system and the reflecting object determined from the composite signal with the radial velocity determined from the second composite signal.

In some instances, determining the LIDAR data for a sample region includes the electronics identifying one or more composite signals (i.e. the composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

Although FIG. 2 is described in the context of components being arranged such that the first comparative signals, the second comparative signals, the first reference signals, and the second reference signals each have the first polarization state, other configurations of the components in FIG. 2 can arranged such that the composite signals result from combining a reference signal and a comparative signal of the same linear polarization state and the second composite signal results from combining a reference signal and a comparative signal of the same linear polarization state. For instance, the beamsplitter 120 can be constructed such that the second portion of the system return signal has the first polarization state and the first portion of the system return signal has the second polarization state, the polarization rotator receives the first portion of the system return signal, and the outgoing LIDAR signal can have the second polarization state. In this example, the first LIDAR input signal and the second LIDAR input signal each has the second polarization state.

The above system configurations result in the first portion of the system return signal and the second portion of the system return signal being directed into different composite signals. As a result, since the first portion of the system return signal and the second portion of the system return signal are each associated with a different polarization state but electronics can process each of the composite signals, the LIDAR system compensates for changes in the polarization state of the LIDAR output signal in response to reflection of the LIDAR output signal.

The LIDAR adapter of FIG. 2 can include additional optical components in addition to the circulator 100. For instance, the LIDAR adapter can include components for directing and controlling the optical path of the LIDAR output signal and the system return signal. As an example, the adapter of FIG. 2 includes an optional amplifier 110 positioned so as to receive and amplify the LIDAR output signal before the LIDAR output signal enters the circulator 100. The amplifier 110 can be operated by the electronics 68 allowing the electronics 68 to control the power of the LIDAR output signal.

FIG. 2 also illustrates the LIDAR adapter including an optional first lens 112 and an optional second lens 114. The first lens 112 can be configured to couple the LIDAR output signal to a desired location. In some instances, the first lens 112 is configured to focus or collimate the LIDAR output signal at a desired location. In one example, the first lens 112 is configured to couple the LIDAR output signal on the first port 104 when the LIDAR adapter does not include an amplifier 110. As another example, when the LIDAR adapter includes an amplifier 110, the first lens 112 can be configured to couple the LIDAR output signal on the entry port to the amplifier 110. The second lens 114 can be configured to couple the LIDAR output signal at a desired location. In some instances, the second lens 114 is configured to focus or collimate the LIDAR output signal at a desired location. For instance, the second lens 114 can be configured to couple the LIDAR output signal the on the facet 24 of the comparative waveguide 22.

The LIDAR adapter can include an optional third lens 126. The third lens 126 can be configured to couple the second LIDAR output signal at a desired location. In some instances, the third lens 126 focuses or collimates the second LIDAR output signal at a desired location. For instance, the third lens 126 can be configured to focus or collimate the second LIDAR output signal on the facet 52 of the second comparative waveguide 50. The LIDAR adapter also includes one or more direction changing components 124 such as mirrors and prisms. FIG. 2 illustrates the LIDAR adapter including a mirror as a direction changing component 124 that redirects the second portion of the system return signal from the circulator 100 to the facet 52 of the second comparative waveguide 50 and/or to the third lens 126.

The LIDAR chips include one or more waveguides that constrains the optical path of one or more light signals. While the LIDAR adapter can include waveguides, the optical path that the system return signal and the LIDAR output signal travel between components on the LIDAR adapter and/or between the LIDAR chip and a component on the LIDAR adapter can be free space. For instance, the system return signal and/or the LIDAR output signal can travel through the atmosphere in which the LIDAR chip, the LIDAR adapter, and/or the base 102 is positioned when traveling between the different components on the LIDAR adapter and/or between a component on the LIDAR adapter and the LIDAR chip. As a result, optical components such as lenses and direction changing components can be employed to control the characteristics of the optical path traveled by the system return signal and the LIDAR output signal on, to, and from the LIDAR adapter.

Suitable bases 102 for the LIDAR adapter include, but are not limited to, substrates, platforms, and plates. Suitable substrates include, but are not limited to, glass, silicon, and ceramics. The components can be discrete components that are attached to the substrate. Suitable techniques for attaching discrete components to the base 102 include, but are not limited to, epoxy, solder, and mechanical clamping. In one example, one or more of the components are integrated components and the remaining components are discrete components. In another example, the LIDAR adapter includes one or more integrated amplifiers and the remaining components are discrete components.

The LIDAR system can be configured to compensate for polarization. Light from a laser source is typically linearly polarized and hence the LIDAR output signal is also typically linearly polarized. Reflection from an object may change the angle of polarization of the returned light. Accordingly, the system return signal can include light of different linear polarization states. For instance, a first portion of a system return signal can include light of a first linear polarization state and a second portion of a system return signal can include light of a second linear polarization state. The intensity of the resulting composite signals is proportional to the square of the cosine of the angle between the comparative and reference signal polarization fields. If the angle is 90 degrees, the LIDAR data can be lost in the resulting composite signal. However, the LIDAR system can be modified to compensate for changes in polarization state of the LIDAR output signal.

Figure 3:
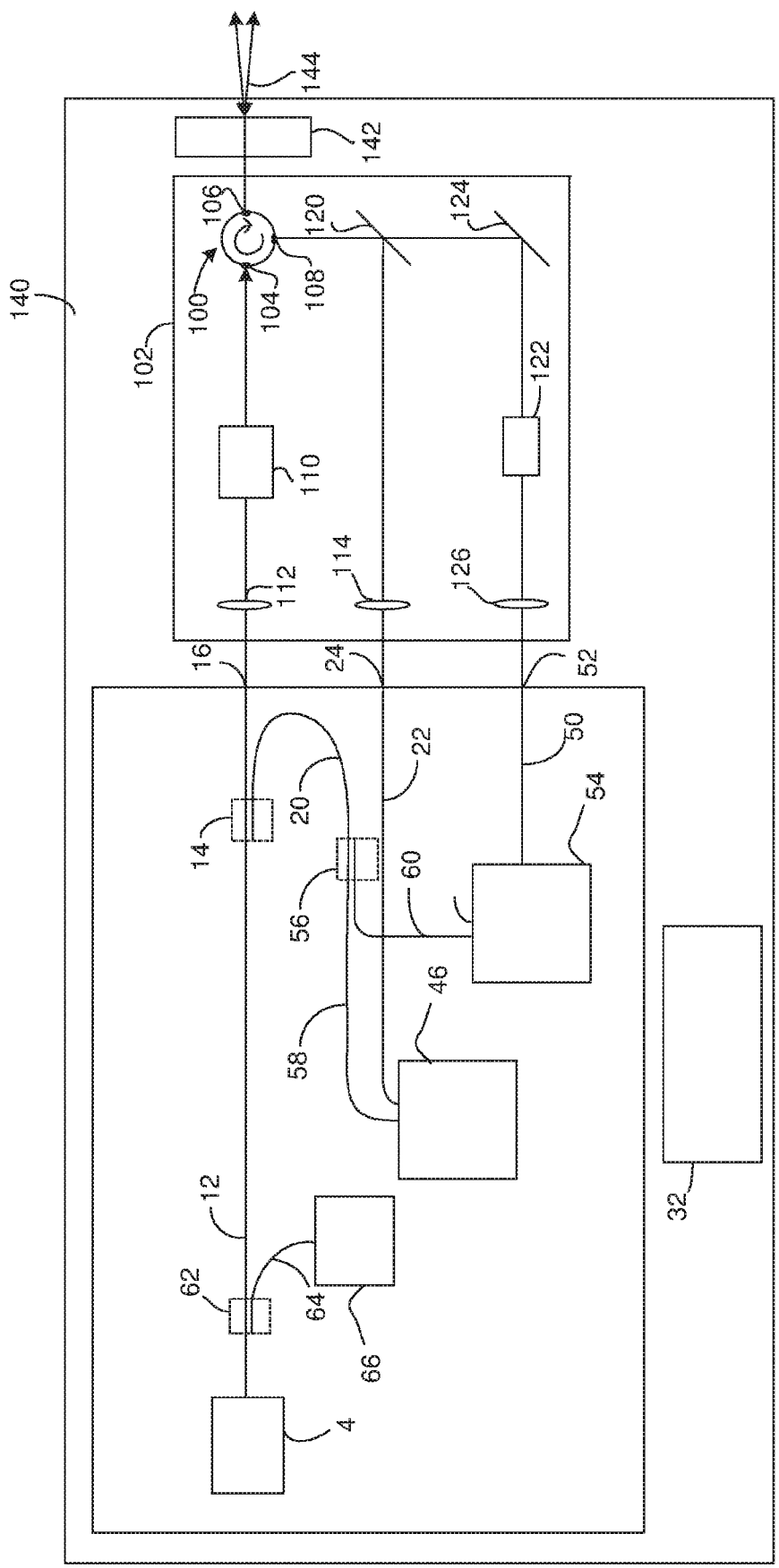
FIG. 3 is a topview of an example of a LIDAR system that includes the LIDAR chip of FIG. 1 and the LIDAR adapter of FIG. 2 on a common support.

When the LIDAR system includes a LIDAR chip and a LIDAR adapter, the LIDAR chip, electronics, and the LIDAR adapter can be positioned on a common mount. Suitable common mounts include, but are not limited to, glass plates, metal plates, silicon plates and ceramic plates. As an example, FIG. 3 is a topview of a LIDAR system that includes the LIDAR chip and electronics 68 of FIG. 1 and the LIDAR adapter of FIG. 2 on a common support 140. Although the electronics 68 are illustrated as being located on the common support, all or a portion of the electronics can be located off the common support. When the light source 4 is located off the LIDAR chip, the light source can be located on the common support 140 or off of the common support 140. Suitable approaches for mounting the LIDAR chip, electronics, and/or the LIDAR adapter on the common support include, but are not limited to, epoxy, solder, and mechanical clamping.

The LIDAR systems can include components including additional passive and/or active optical components. For instance, the LIDAR system can include one or more components that receive the LIDAR output signal from the LIDAR chip or from the LIDAR adapter. The portion of the LIDAR output signal that exits from the one or more components can serve as the system output signal. As an example, the LIDAR system can include one or more beam steering components that receive the LIDAR output signal from the LIDAR chip or from the LIDAR adapter and that output all or a fraction of the LIDAR output signal that serves as the system output signal. For instance, FIG. 3 illustrates a beam steering component 142 that receive a LIDAR output signal from the LIDAR adapter. Although FIG. 3 shows the beam steering component positioned on the common support 140, the beam steering component can be positioned on the LIDAR chip, on the LIDAR adapter, off the LIDAR chip, or off the common support 140. Suitable beam steering components include, but are not limited to, movable mirrors, MEMS mirrors, optical phased arrays (OPAs), and actuators that move the LIDAR chip, LIDAR adapter, and/or common support.

The electronics can operate the one or more beam steering component 142 so as to steer the system output signal to different sample regions 144. The sample regions can extend away from the LIDAR system to a maximum distance for which the LIDAR system is configured to provide reliable LIDAR data. The sample regions can be stitched together to define the field of view. For instance, the field of view of for the LIDAR system includes or consists of the space occupied by the combination of the sample regions.

FIG. 4A through FIG. 4B illustrate an example of a suitable processing component for use as the first processing component 46. The processing component receives a comparative signal from a comparative waveguide 196 and a reference signal from a reference waveguide 198. The comparative waveguide 22 and the first reference waveguide 58 shown in FIG. 1 can serve as the comparative waveguide 196 and the reference waveguide 198.

The processing component includes a second splitter 200 that divides the comparative signal carried on the comparative waveguide 196 onto a first comparative waveguide 204 and a second comparative waveguide 206. The first comparative waveguide 204 carries a first portion of the comparative signal to a light-combining component 211. The second comparative waveguide 208 carries a second portion of the comparative signal to a second light-combining component 212.

The processing component includes a first splitter 202 that divides the reference signal carried on the reference waveguide 198 onto a first reference waveguide 208 and a second reference waveguide 210. The first reference waveguide 208 carries a first portion of the reference signal to the light-combining component 211. The second reference waveguide 210 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the first composite signal to a first electrical signal. The second detector waveguide 222 carries a second portion of the first composite signal to a second light sensor 224 that converts the second portion of the first composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 208 and the second reference waveguide 210 are constructed to provide a phase shift between the first portion of the reference signal and the second portion of the reference signal. For instance, the first reference waveguide 208 and the second reference waveguide 210 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 208 and the second reference waveguide 210 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 4B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 4B are included on the LIDAR chip. In some instances, the components illustrated in the schematic of FIG. 4B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal.

The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the second data signal but the portion of the second waveform in the first data signal is in-phase relative to the portion of the second waveform in the second data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal. The reference signal includes or consists of light that has not exited from the LIDAR system and the comparative signal includes or consists of light that has exited from the LIDAR system. As a result, the light from which the first data signal is generated includes a contribution from light that has exited from the LIDAR system and from light that has not exited the LIDAR system. Additionally, the light from which the second data signal is generated includes a contribution from light that has exited from the LIDAR system and from light that has not exited the LIDAR system.

The electronics 68 include a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the second Analog-to-Digital Converter (ADC) 266 as an input. Accordingly, the transform component receives the data signals on multiple different lines. Suitable lines include, but are not limited to, electrical conductors such as metal traces, electrical wires, and coaxial cables.

The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the beat frequency of the beating signals such as the composite signal. The electronics 68 include a LIDAR data generator 270 that receives the output from the transform component 268 and processes the output from the transform component 268 so as to generate the LIDAR data (material indicator(s) and/or distance and/or radial velocity between the reflecting object and the LIDAR chip or LIDAR system).

FIG. 4C through FIG. 4D illustrate an example of a suitable processing component for use as the second processing component 54. The processing component receives a comparative signal from a comparative waveguide 196 and a reference signal from a reference waveguide 198. The second comparative waveguide 50 and the second reference waveguide 60 shown in FIG. 1 can serve as the comparative waveguide 196 and the reference waveguide 198.

The processing component includes a light-combining component 211 that receives the comparative signal from the comparative waveguide 196 and the reference signal from the reference waveguide 198. The first light-combining component 211 combines the comparative signal and the reference signal into a first composite signal. Due to the difference in frequencies between the comparative signal and the reference signal, the first composite signal is beating between the comparative signal and the reference signal.

The first light-combining component 211 also splits the first composite signal onto a first detector waveguide 221 and a second detector waveguide 222. The first detector waveguide 221 carries a first portion of the first composite signal to a first light sensor 223 that converts the first portion of the first composite signal to a first electrical signal. The second detector waveguide 222 carries a second portion of the first composite signal to a second light sensor 224 that converts the second portion of the first composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the first composite signal is phase shifted by 180° relative to the portion of the comparative signal (i.e. the portion of the first portion of the comparative signal) in the second portion of the first composite signal but the portion of the reference signal (i.e. the portion of the first portion of the reference signal) in the first portion of the first composite signal is not phase shifted relative to the portion of the reference signal (i.e. the portion of the first portion of the reference signal) in the second portion of the first composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

The first light sensor 223 and the second light sensor 224 can be connected as a balanced detector. For instance, FIG. 4B provides a schematic of the relationship between the electronics, the first light sensor 223 and the second light sensor 224. The symbol for a photodiode is used to represent the first light sensor 223 and the second light sensor 224 but one or more of these sensors can have other constructions. In some instances, all of the components illustrated in the schematic of FIG. 4B are included on the LIDAR chip. In some instances, the components illustrated in the schematic of FIG. 4B are distributed between the LIDAR chip and electronics located off of the LIDAR chip.

The electronics connect the first light sensor 223 and the second light sensor 224 as a first balanced detector 225. In particular, the first light sensor 223 and the second light sensor 224 are connected in series. The serial connection in the first balanced detector is in communication with a first data line 228 that carries the output from the first balanced detector as a first data signal.

The first data signal is an electrical representation of the first composite signal. Accordingly, the first data signal includes a contribution from a first waveform and a second waveform and the second data signal is a composite of the first waveform and the second waveform. The first data signal is beating as a result of the beating between the comparative signal and the reference signal, i.e. the beating in the first composite signal. The reference signal includes or consists of light that has not exited from the LIDAR system and the comparative signal includes or consists of light that has exited from the LIDAR system. As a result, the light from which the first data signal is generated includes a contribution from light that has exited from the LIDAR system and from light that has not exited the LIDAR system.

The reference signal includes or consists of light that has not exited from the LIDAR system and the comparative signal includes or consists of light that has exited from the LIDAR system. As a result, the light from which the first data signal is generated includes a contribution from light that has exited from the LIDAR system and from light that has not exited the LIDAR system. Additionally, the light from which the second data signal is generated includes a contribution from light that has exited from the LIDAR system and from light that has not exited the LIDAR system.

The electronics 68 include a transform mechanism 238 configured to perform a mathematical transform on the first data signal and the second data signal. For instance, the mathematical transform can be a real Fourier transform with the first data signal as an input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The first digital data signal is a digital representation of the first data signal.

The transform mechanism 238 includes a second transform component 272 that receives the first data signal. For instance, the second transform component 272 receives the first digital data signal from the first Analog-to-Digital Converter (ADC) 264 as an input. Accordingly, the transform component receives data signals on a single line. Suitable lines include, but are not limited to, electrical conductors such as metal traces, electrical wires, and coaxial cables.

The second transform component 272 can be configured to perform a mathematical transform on the first data signal so as to convert from the time domain to the frequency domain. The mathematical transform can be a real transform such as a real Fast Fourier Transform (FFT). In contrast with a complex transform, a real transform can show multiple solutions for the beat frequency of the composite signal. The LIDAR data generator 270 included in the electronics 68 of FIG. 4B can receive the output of the second transform component 272 in addition to receiving the output of the transform component 268.

Figure 4E:
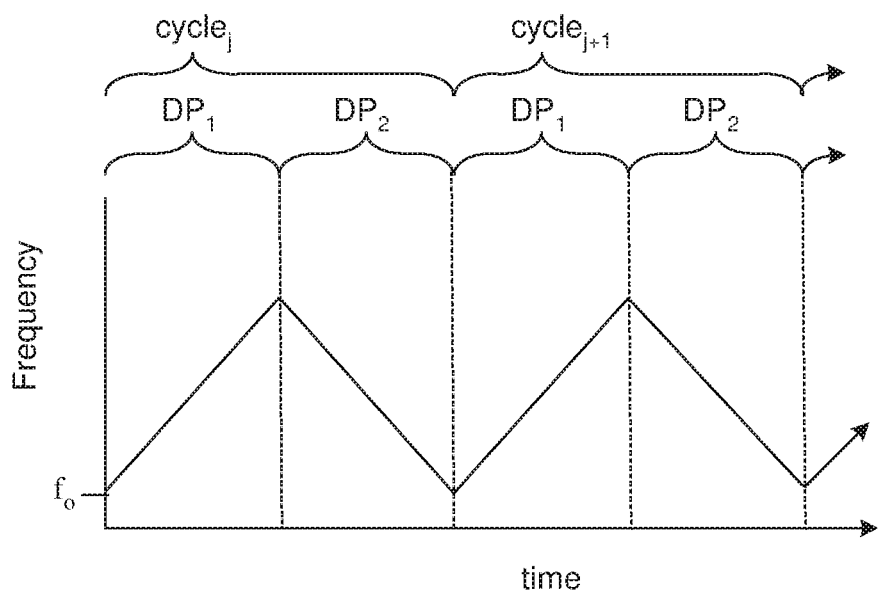
FIG. 4E shows an example of a relationship between the frequency of a system output signal, time, cycles and data periods.

The LIDAR data generator 270 can use the frequency versus time pattern of the system output signal to generate LIDAR data. FIG. 4E shows an example of a relationship between the frequency of the system output signal, time, cycles and data periods. The base frequency of the system output signal ($f_o$) can be the frequency of the system output signal at the start of a cycle.

FIG. 4E shows frequency versus time for a sequence of two cycles labeled $cycle_j$ and $cycle_{j+1}$. In some instances, the frequency versus time pattern is repeated in each cycle as shown in FIG. 4E. The illustrated cycles do not include re-location periods and/or re-location periods are not located between cycles. As a result, FIG. 4E illustrates the results for a continuous scan.

Each cycle includes K data periods that are each associated with a period index k and are labeled $DP_k$. In the example of FIG. 4E, each cycle includes two data periods labeled $DP_k$ with k =1 and 2. In some instances, the frequency versus time pattern is the same for the data periods that correspond to each other in different cycles as is shown in FIG. 4E. Corresponding data periods are data periods with the same period index. As a result, each data period $DP_1$ can be considered corresponding data periods and the associated frequency versus time patterns are the same in FIG. 4E. At the end of a cycle, the electronics return the frequency to the same frequency level at which it started the previous cycle.

During the data period DPi, and the data period $DP_2$, the electronics operate the light source such that the frequency of the system output signal changes at a linear rate α. The direction of the frequency change during the data period $DP_1$ is the opposite of the direction of the frequency change during the data period $DP_2$. The electronics can operate the light source 4 so as to achieve a frequency versus time pattern according to FIG. 4E. For instance, the electronics can tune the voltage and/or current applied to a light source so as to achieve the desired frequency versus time pattern.

The light sources commonly used in LIDAR systems, such as lasers, typically output light in a single polarization state. Accordingly, the system output signal is typically in the first polarization state or the second polarization state. Upon reflection by an object, all or a portion of the reflected light can retain the polarization state in which it was transmitted and/or the reflection can change the polarization state of all or a portion of the reflected light. Accordingly, when a system output signal carries light in a first polarization state and is reflected by an object outside of the LIDAR system, all or a portion of the light in the resulting system return signal can be in the first polarization state and/or all or a portion of the light in the resulting system return signal can be in the second polarization state. When the system output signal carries light in a second polarization state and is reflected by an object outside of the LIDAR system, all or a portion of the light in the resulting system return signal can be in the first polarization state and/or all or a portion of the light in the resulting system return signal can be in the second polarization state. The portion of the reflected light that retains the polarization state in which it was transmitted can serve as retained state light. The portion of the reflected light that has its polarization state change in response to reflection can serve as changed state light. Accordingly, the system return signal can have a retained state portion and/or a changed state portion.

The LIDAR system can be configured such that the first processing component 46 receives the retained state light and the second processing component 54 receives the changed state light. For instance, the first comparative signal received by the first processing component 46 can include or consist of light from the retained state portion of the system return signal and the second comparative signal received by the second processing component 54 can include or consist of light from the changed state portion of the system return signal. In one example, this configuration is achieved by selection of the beamsplitter 120 disclosed in the context of FIG. 2. For instance, when the LIDAR system is constructed as shown in FIG. 3 and the beamsplitter 120 transmits the changed state portion but reflects the retained state portion, the first processing component 46 receives the retained state light and the second processing component 54 receives the changed state light.

Even though the first comparative signal has the retained state light and the second comparative signal has the changed state light, the light in the first comparative signal and the second comparative signal can have the same polarization state as disclosed in the context of FIG. 2. For instance, optical components such as the polarization rotator 122 included on the adapter of FIG. 2 can cause the first comparative signal and the second comparative signal to have the same polarization state. Accordingly, the light in the first comparative signal, the second comparative signal, the reference signal, and portions of the reference signal can have the same polarization state.

When the first processing component 46 receives the retained state light, the output from the transform component 268 indicates the beat frequency for the beating signals that include the retained state light. In some instances, these beating signals exclude light from the changed state light. When the transform component 268 is a complex Fourier transform as disclosed in the context of FIG. 4B, the transform component 268 outputs a single peak for the beat frequency as illustrated in the power versus frequency graph of FIG. 5A. When the second processing component 54 receives the changed state light, the output from the second transform component 272 indicates the beat frequency for the beating signals that include the changed state light. In some instances, these beating signals exclude light from the retained state light. When the second transform component 272 is a real Fourier transform as disclosed in the context of FIG. 4D, the transform component 268 can output multiple peaks for the beat frequency as illustrated in the power versus frequency graph of FIG. 5B. When the real transform output multiple peaks, it is often unclear and/or ambiguous as to which peak accurately represents the beat frequency.

The LIDAR data generator can use the output of the transform component 268 and/or the output of second transform component 272 to generate LIDAR data for a sample region that is illuminated by the system output signal. The LIDAR data can include any, all or a portion of the datum selected from a group consisting of an indicator of the material from which the reflecting object is constructed, a radial velocity between the object and the LIDAR system, a distance between the object and the LIDAR system, a refined radial velocity, and a refined distance between the object and the LIDAR system.

An example of an indicator of the material from which the reflecting object is constructed is a signal level ratio such as a ratio of a signal level of the retained state light: the signal of the changed state light. In some instances, the signal level is the signal magnitude. One example of a suitable signal level ratio is a polarization state power ratio represented by a ratio of the power of the retained state light: the power of the changed state light. Different object materials cause the system output signal to be reflected at different polarization state power ratios. Accordingly, knowing the polarization state power ratio can indicate what material is being illuminated by the system output signal. When the LIDAR system is used to guide a self-driving vehicle, the ability to distinguish between rain or snow and concrete or metal can be important. The polarization state power ratio can be used in making these sorts of distinctions in self-driving vehicles and other LIDAR applications.

In one example of the LIDAR data generator generating a material indicator that includes or consists of the polarization state power ratio, the LIDAR data generator performs a peak find on the output of the transform component 268 to identify a first peak in the beat frequency. The identified peak can be used to remove the ambiguity regarding the correct peak in the output of the second transform component 272. For instance, the peak in the output of the second transform component 272 that occurs closest to the first identified peak frequency can be approximated as the peak that accurately reflects the beat frequency of the beating signals generated by the second processing component 54. Accordingly, the LIDAR data generator can perform a peak find on the output of the second transform component 272 and can find the peak closest to the identified. The peak identified in the output of the second transform component 272 can serve as a second identified peak. The LIDAR data generator can then determine a ratio of the power of the beat signal at the first identified peak to a power of the beat signal at the second identified peak. The determined ratio can serve as the polarization state power ratio that can be used to identify materials that are illuminated by the system output signal. Suitable peak finders include, but are not limited to, peak analysis mechanisms, peak finding algorithms.

The LIDAR data generator can use the output from the output of the transform component 268 to generate the radial velocity between the object and the LIDAR system and/or the distance between the object and the LIDAR system. The LIDAR data generator can use the previously identified first peak and/or perform a peak find on the output of the transform component 268 to find identify a first peak in the beat frequency. The frequency at the first identified peak represents the beat frequency of the composite signals that each includes a comparative signal beating against a reference signal. The LIDAR data generator can combine the beat frequencies ($f_{LDP}$) from two or more different data periods to generate the LIDAR data. For instance, the beat frequency determined from $DP_1$ in FIG. 4E can be combined with the beat frequency determined from $DP_2$ in FIG. 4E to determine the LIDAR data. As an example, the following equation applies during a data period where electronics increase the frequency of the outgoing LIDAR signal during the data period such as occurs in data period $DP_1$ of FIG. 4E: $f_{ub} = -f_d + \alpha\tau$ where $f_{ub}$ is the frequency provided by the transform component 268 ($f_{LDP}$ determined from $DP_1$ in this case), fd represents the Doppler shift ($f_d = 2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 4E: $f_{db} = -f_d - \alpha\tau$ where $f_{db}$ is a frequency provided by the transform component 268 (fi, $_{LDP}$ determined from $DP_2$ in this case). In these two equations, $f_d$ and $\tau$ are unknowns. The electronics solve these two equations for the two unknowns. The radial velocity for the sample region then be quantified from the Doppler shift ($v = c*f_d/(2f_c)$) and/or the separation distance for that sample region can be quantified from $c*f_d/2$.

Figure 5A:
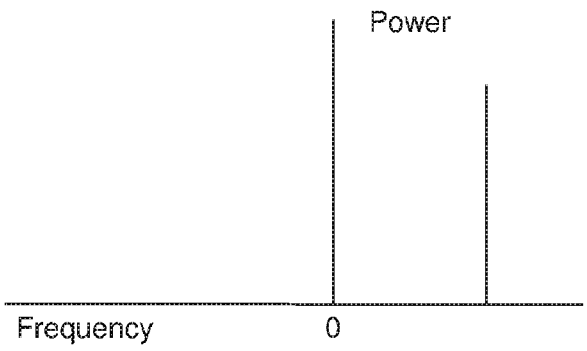
FIG. 5A illustrates the output of a first transform component that performs a complex transform.
Figure 5B:
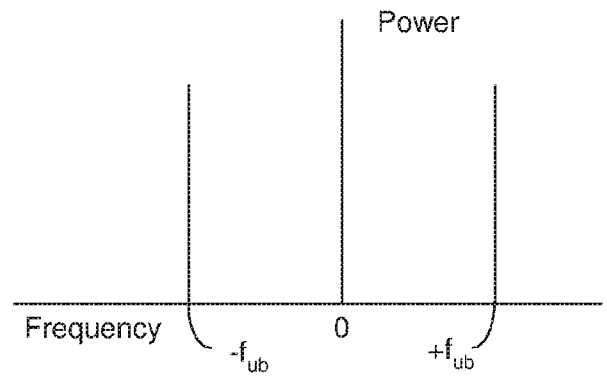
FIG. 5B illustrates the output of a second transform component that performs a real transform.
Figure 5C:
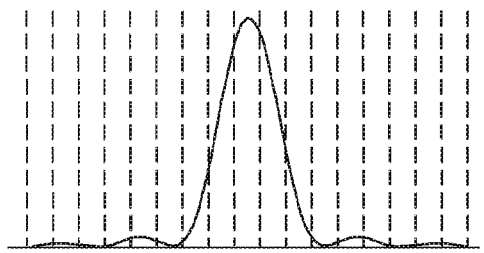
FIG. 5C illustrates a peak in the output of the first transform component.

The LIDAR data generator can combine the output from the transform component 268 and the output from the second transform component 272 to generate a refined radial velocity between the object and the LIDAR system and/or a refined distance between the object and the LIDAR system. The refined radial velocity and/or the refined distance are generated from beating signal data with reduced noise levels. For instance, the LIDAR data generator can identify the frequencies of the first identified peak and the first identified peak as disclosed above. However, the peaks illustrated in FIG. 5A and FIG. 5B are simplified for the purposes of illustration. The peaks can generally be more accurately represented by the square of a sinc function. For instance, the portion of the power versus frequency curve that is output from the transform component 268 and is located around the first identified peak can be represented by a sinc-squared function such as is illustrated in FIG. 5C. The portion of the power versus frequency curve that is output from the transform component 268 and is located around the second identified peak can be represented by a sinc-squared function such as is illustrated in FIG. 5D.

Figure 5D:
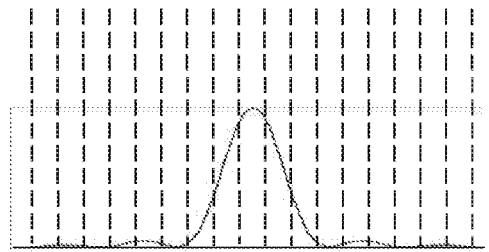
FIG. 5D illustrates a peak in the output of the second transform component.

FIG. 5D illustrates a lower power level at the second identified peak than is illustrated at the first identified peak because FIG. 5D represent the beat frequency for the beating signal having the changed state light. Even if the system output signal were to be completely depolarized by the reflecting object, the polarization state power ratio is about 1:1. As a result, with complete depolarization, there are equal power levels of changed state light and retained state light in the system return signal. When complete depolarization does not occur, in the system return signal, the power level of the retained state light exceeds the power level of the changed state light. As a result, the power of the retained state light is generally greater than or equal to the power of the changed state light.

Figure 5E:
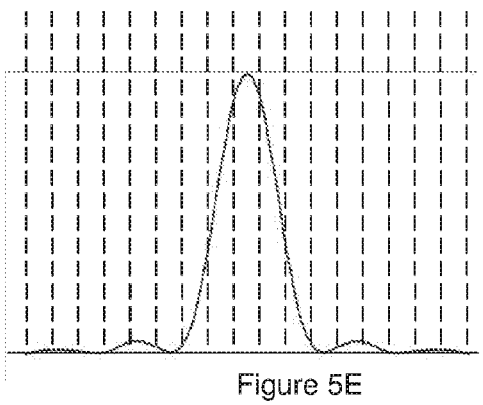
FIG. 5E illustrates a peak that results from adding the peak of FIG. 5C and the peak of FIG. 5D.

The LIDAR data generator can add the power versus frequency curves from the transform component 268 and from the second transform component 272. For instance, as is evident in FIG. 5C and FIG. 5D, the power versus frequency curves can be divided into the same bins. The power levels in corresponding bins can be added so as to generate a composite power versus frequency curve as shown in FIG. 5E. As is evident from FIG. 5E, the composite power versus frequency curve has higher power levels that result from the addition of the two curves. Because the composite power versus frequency curve is generated from more data than the independent curve, the composite power versus frequency curve has reduced signal-to-noise levels. The LIDAR data generator can perform a peak find on the composite power versus frequency curve to find a composite peak.

The LIDAR data generator can use the composite peak to generate the refined radial velocity and/or the refined distance. The frequency at the composite peak can serve as a composite beat frequency. The LIDAR data generator can combine the composite beat frequencies ($f_{LDP}$) from two or more different data periods to generate the refined radial velocity and/or the refined distance. For instance, a sample region can be illuminated by the system output signal during the data periods labeled $DP_1$ and $DP_2$. The composite beat frequency determined from $DP_1$ in FIG. 4E can be combined with the composite beat frequency determined from $DP_2$ in FIG. 4E to determine the refined radial velocity and/or the refined distance for the sample region. As an example, the following equation applies during a data period where electronics increase the frequency of the outgoing LIDAR signal during the data period such as occurs in data period $DP_1$ of FIG. 4E: $f_{ub} = -f_d + \alpha \tau$ where $f_{ub}$ is the composite beat frequency, $f_d$ represents the Doppler shift ($f_d = 2vf_c/c$) where $f_c$ represents the optical frequency ($f_o$), c represents the speed of light, v is the radial velocity between the reflecting object and the LIDAR system where the direction from the reflecting object toward the LIDAR system is assumed to be the positive direction, and c is the speed of light. The following equation applies during a data period where electronics decrease the frequency of the outgoing LIDAR signal such as occurs in data period $DP_2$ of FIG. 4E: $f_{db} = -f_d - \alpha \tau$ where $f_{db}$ is the composite beat frequency. In these two equations, $f_d$ and $\tau$ are unknowns. The electronics solve these two equations for the two unknowns. The refined radial velocity for the sample region then be quantified from the Doppler shift (v= $c*f_d/(2f_c)$) and/or the refined distance for that sample region can be quantified from $c*f_d/2$.

Suitable electronics 68 can include, but are not limited to, an electronic controller that includes or consists of analog electrical circuits, digital electrical circuits, processors, microprocessors, digital signal processors (DSPs), Field Programmable Gate Arrays (FPGAs), computers, microcomputers, or combinations suitable for performing the operation, monitoring and control functions described above. In one example, the LIDAR data generator is or includes a digital signal processor (DSP). In some instances, the electronic controller has access to a memory that includes instructions to be executed by the electronic controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

The above LIDAR systems include multiple optical components such as a LIDAR chip, LIDAR adapters, light source, light sensors, waveguides, and amplifiers. In some instances, the LIDAR systems include one or more passive optical components in addition to the illustrated optical components or as an alternative to the illustrated optical components. The passive optical components can be solid-state components that exclude moving parts. Suitable passive optical components include, but are not limited to, lenses, mirrors, optical gratings, reflecting surfaces, splitters, demulitplexers, multiplexers, polarizers, polarization splitters, and polarization rotators. In some instances, the LIDAR systems include one or more active optical components in addition to the illustrated optical components or as an alternative to the illustrated optical components. Suitable active optical components include, but are not limited to, optical switches, phase tuners, attenuators, steerable mirrors, steerable lenses, tunable demulitplexers, tunable multiplexers.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a first transform component configured to perform a complex mathematical transform on first signals; and
a second transform component configured to perform a real mathematical transform on second signals,
an output of the second transform component having multiple different peaks that each occurs at a frequency that is a candidate for a beat frequency of the second signals; and
electronics configured to use an output of the first transform component in combination with an output of the second transform component to generate LIDAR data,
wherein the electronics being configured to use the output of the first transform component in combination with the output of the second transform component includes the electronics being configured to use a peak in an output of the first transform component to identify the peak in the output of the second transform component that is located at the beat frequency of the second signals.

2. The system of claim 1, wherein the complex mathematical transform is a complex fast Fourier transform and the real mathematical transform is a real fast Fourier transform.

3. The system of claim 2, wherein the first transform component receives the first signals on at least two different input lines and the second transform component receives the second signals on only one input line.

4. The system of claim 3, wherein the in-phase signals are received on a different input line from the quadrature signals.

5. The system of claim 1, wherein the LIDAR data includes a material indicator that indicates an identity of a material located outside of the LIDAR system.

6. The system of claim 5, wherein the material indicator is a signal level ratio.

7. The system of claim 1, further comprising: one or more optical components configured to output a system output signal and to receive a system return signal,
the system return signal including light from the system output signal after the system output signal has been reflected by an object located outside of the LIDAR system,
the system output signal having a first polarization state,
a retained state portion of the light in the system return signal retaining the first polarization state of the system output signal, a changed state portion of the light in the system return signal having a second polarization state that is different from the first polarization state;

the first signals being generated from light that includes light from the retained state portion of the light in the system return signal, the second signals being generated from light that includes light from the changed state portion of the light in the system return signal.

8. The system of claim 7, wherein the light from which the second signals are generated excludes light from the retained state portion and the light from which the first signals are generated excludes light from the changed state portion.

9. The system of claim 7, wherein the system output signal is polarized.

10. The system of claim 7, wherein the light from which the second signals are generated is all of the same polarization state and the light from which the first signals are generated is all of the same polarization state.

11. The system of claim 7, wherein the light from the second signals are generated includes light that has not exited from the LIDAR system, and the light from wich the first signals are generated includes light that has not exited the LIDAR system.

12. The system of claim 2, wherein the in-phase signals are received on a different input line from the quadrature signals.

13. The system of claim 1, wherein the first signals and the second signals are beat signals.

14. The system of claim 1, wherein the LIDAR data includes at least one component selected from the group consisting of a distance between the LIDAR system and an object located outside of the LIDAR system and a radial distance between the LIDAR system and an object located outside of the LIDAR system.

15. The system of claim 1, wherein the electronics add the output of the first transform component and the output from the second transform compenent.

16. The system of claim 1, wherein the electronics being configured to use the output of the first transfrom component in combination with the output of the second transform component to generate the LIDAR data includes the electronics being configured to use a frequency at the identified peak as the beat frequency of the second signals in a calculation of the LIDAR data where the beat fequency of the second signals is a variable in the calculation and the LIDAR data inlcudes at least one componenet selected from the group consisting of a distance between the LIDAR system and an object located outside of the LIDAR system and a radial distance between the LIDAR system and an object outside of the LIDAR system.

17. A LIDAR system, comprising:

a first transform component configured to receive first digital signals from multiple different input lines and to perform a first mathematical transform on the first digital signals received from the different input lines;

a second transform component configured to receive second digital signals from only one input line and to perform a second mathematical transform on the second digital signals, an output of the second transform component having multiple different peaks that each occurs at a frequency that is a candidate for a beat frequency of the second signals; and electronics configured to use an output of the first transform component in combination with an output of the second transform component to generate LIDAR data, wherein the electronics being configured to use the output of the first transform component in combination with the output of the second transform component includes the electronics being configured to use a peak in an output of the first transform component to identify the peak in the output of the second transform component that is located at the beat frequency of the second signals.

18. The system of claim 17, wherein the first transform component performs a complex mathematical transform on the first digital signals and the second transform component performs a real mathematical transform on the second digital signals.

19. The system of claim 18, wherein the complex mathematical transform is a complex fast Fourier transform and the real mathematical transform is a real fast Fourier transform.

20. A method of operating a LIDAR system, comprising:

performing a first mathematical transform on first digital signals received on multiple different lines; and performing a second mathematical transform on second digital signals received on a single line; and using an output of the first mathematical transform in combination with an output of the second mathematical transform to generate LIDAR data, wherein using the output of the first mathematical transform in combination with the output of the second mathematical transform includes using a peak in the output of the first mathematical transform to identify one of multiple peaks in the output of the second transform component that is located at a beat frequency of the second signals.

* * * * *